UNITED STATES PATENT OFFICE.

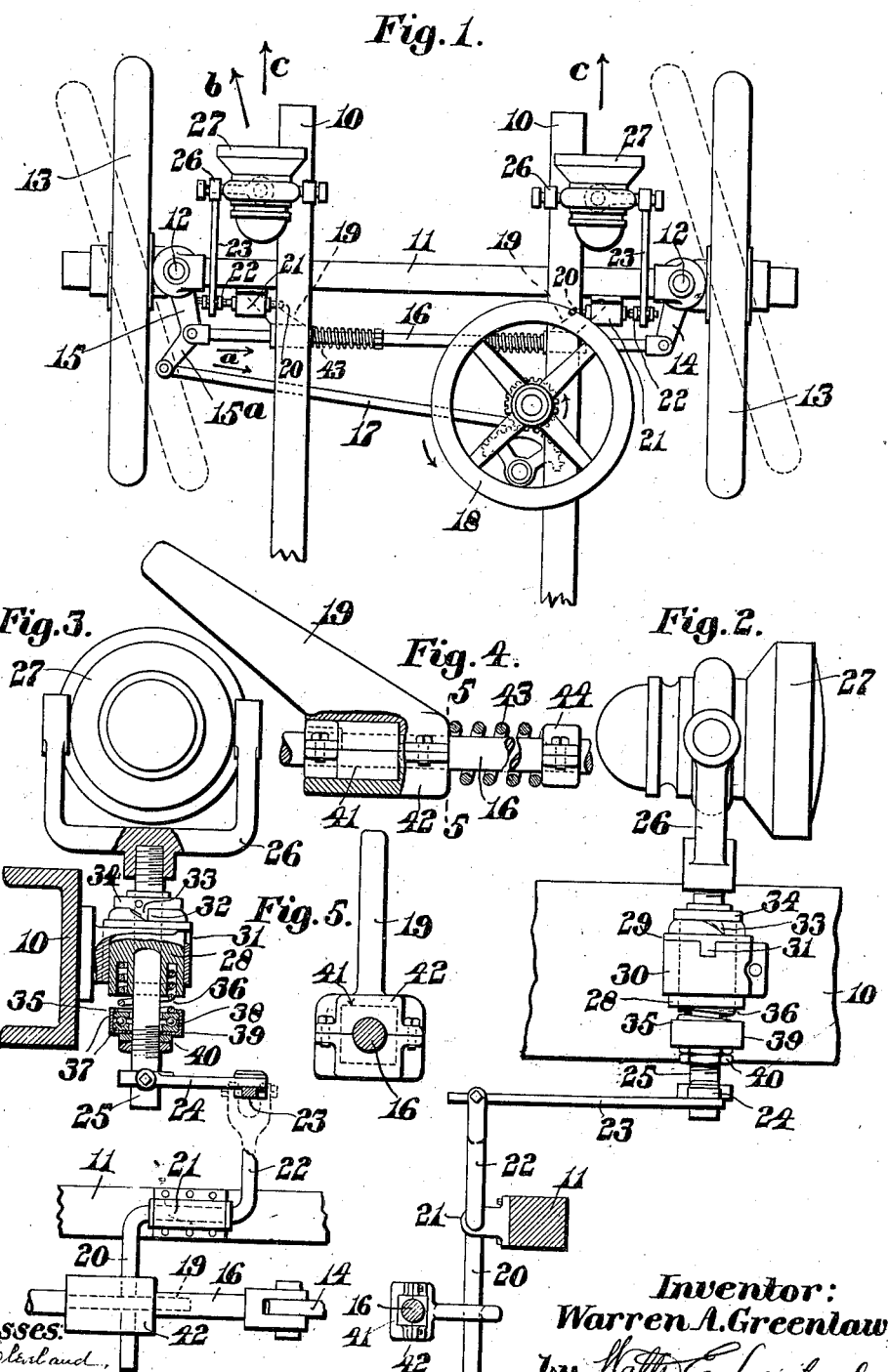

WARREN A. GREENLAW, OF MELROSE HIGHLANDS, MASSACHUSETTS.

LAMP-CONTROLLING DEVICE FOR MOTOR-CARS.

977,729.  Specification of Letters Patent.  Patented Dec. 6, 1910.

Application filed March 9, 1910. Serial No. 548,513.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Lamp-Controlling Devices for Motor-Cars, of which the following is a specification.

This invention relates to devices for operating the lamps of a motor car and its particular object is to control the angular movement of one of the lamps by means of the steering mechanism when the car is making a turn. Its purpose is to provide a means whereby the lamps on the side toward which the turn is being made is moved about its vertical axis by the operation of the steering mechanism so that the rays from the lamp will light up the road over which the inner turning wheel will pass, the other lamp being left in its normal position so that the rays therefrom will light up the path of the outer turning wheel.

The invention consists in certain novel features of construction and arrangement of parts which will be readily understood by reference to the description of the drawings and to the claims hereinafter given.

Of the drawings: Figure 1 represents a plan of a portion of a motor car frame, its front steering wheel and the steering mechanism therefor, showing mounted on said frame suitable lamps adapted to be moved about a vertical axis by the operation of said steering mechanism. Fig. 2 represents an elevation of one of the lamps in its supporting bearing showing the devices for moving the lamp about its axis. Fig. 3 represents a rear elevation of the same, portions of the various members being broken in section. Fig. 4 represents a plan view partially in section of a portion of the reciprocating member forming part of the steering mechanism and the lamp support operating finger mounted thereon, and Fig. 5 represents a section through the same, the cutting plane being on line 5—5 on Fig. 4.

Similar characters designate like parts throughout the several figures of the drawings.

In the drawings, 10 represents a chassis or frame of the motor car having secured to its free end the transverse member 11 to each end of which is pivoted at 12 a steering wheel 13, these wheels being turned about the pivot 12 by means of the arms 14 and 15 connected with one another by the link 16. The arm 15 is provided with an extension $15^a$ which is connected by the draw link 17 to the steering mechanism 18, all of the usual construction.

It is obvious that when the steering wheel is moved about its axis the steering wheels are moved about the pivots 12, this operation causing the link 16 to be moved transversely of the body 10 of the car. Secured to the link 16 are two fingers 19 extending forward. Each of these fingers 19 has an inclined face which normally bears against the downwardly extending arm 20 of a lever pivotally mounted in a bearing 21 secured to the member 11. The opposite end of this lever has an upwardly extending arm 22 to which is articulated a link 23 the opposite end of which is pivotally connected to a radial arm 24 rigidly secured to the lower end of a rod 25. This rod 25 has mounted upon its upper end a forked member or yoke 26 in which is mounted the usual lamp 27. The rod 25 has a bearing in the cylindrical member 28 provided with a flange 29 resting upon the upper edge of a bracket 30 secured to the chassis or frame 10. The member 28 is provided with a suitable lug 31 fitting into a depression in the bracket 30 to prevent said member 28 turning therein. The upper end of the member 28 has cut therein one or more notches 32 each provided with an inclined face with which a lug or toe 33 on a collar 34 is adapted to engage. This collar 34 is rigidly secured to the rod 25 and is adapted to oscillate therewith.

It is obvious that when the steering mechanism 18 is operated to move the link 16 in the direction of the arrow "$a$" on Fig. 1 of the drawings, the two steering wheels will be turned into the position indicated in dotted lines in said figure. When the link 16 commences to move in the direction of this arrow "$a$" the inclined face of the finger 19 on the left of Fig. 1 will contact with the downwardly extending arm 20 of the pivoted lever and move it about its pivot so that the upwardly extending arm 22 will operate through the lever 23 to cause an oscillation of the rod 25 to bring the lamp 27 into such position that the rays therefrom will be directed in a line indicated by the arrow "$b$" on Fig. 1, thus lighting up the road in the direction over which the inner steering wheel will pass. The opposite lamp will still direct its rays in the direction of the arrow "c" on said figure, lighting up the road directly in advance of the body of the car.

Secured to the oscillating rod 25 beneath the cylindrical member 28 is an anti-friction abutment 35 between which and the member 28 is a compression spring 36 the tension of which operates upon the anti-friction abutment 35 to normally retain the toe 33 at the bottom of the notch 32.

It is obvious that when the radial arm 24 is moved to cause an oscillation of the rod 25 the toe 33 will ride up the inclined face of the notch 32 and as soon as pressure has been withdrawn from the radial arm 24 the tension of the spring 36 will act upon the abutment 35 to return the toe 33 into its normal position which having been accomplished the lamp will again assume a position in which its rays are directed straight ahead in the direction of the arrow "c."

The anti-friction abutment 35 is composed of two disks 37 between which is interposed a plurality of anti-friction members such as the balls 38 the two members being connected together by a cup-shaped member 39 to prevent the displacement of the various members composing this anti-friction abutment. The whole device rests upon the nuts 40 threaded to the rod 25 and adjustable thereon to regulate the tension of the spring 36.

The link 16 has clamped thereto a flat sided member 41 preferably square, as indicated in Figs. 4 and 5, said squared member 41 being adapted to enter a socket in the body portion 42 of the finger 19. A spring 43 interposed between the closed end of this body portion 42 and a collar 44 secured to the link 16 serves to retain the body portion 42 in engagement with said squared member 41.

The finger 19 normally is in the position indicated in Fig. 4 of the drawings but when the motor car is in use during the day and it is undesirable to use the lamps the body portion 42 is moved toward the collar 44 against the tension of the spring 43 and until it has cleared the squared portion 41 and the finger 19 is then moved through an arc of 180° and permitted to return so that the squared portion 41 again enters the socket in the body portion 42 and retains the finger 19 in inoperative position or in such position that during the operation of the steering mechanism the fingers 19 will not contact with the downwardly extending arms 20 and cause any movement of the lamps 27.

It is believed the operation and many advantages of the invention will be fully understood from the foregoing.

Having thus described my invention, I claim:

1. A device for operating the lamps of a motor car, consisting of vertical lamp supports; a bearing for each of said supports in which said supports are movable vertically, said bearings being provided with notches in their upper faces each having an inclined wall; a member secured to each of said supports having a lug adapted to engage with one of said notches; a spring for retaining said lug normally in the bottom of said notch; an anti-friction abutment for said spring surrounding said support; and means operatable by the steering mechanism for oscillating said supports and moving said lug up the inclined wall of said notch against the tension of said spring.

2. A device for operating the lamps of a motor car, consisting of vertical lamp supports; a bearing for each of said supports in which said supports are movable vertically, said bearings being provided with notches in their upper faces each having an inclined wall; a member secured to each of said supports having a lug adapted to engage with one of said notches; springs for retaining said lugs normally in the bottom of said notches; a radial arm secured to each support; a two-armed pivoted lever for each lamp support; a link between one arm of each lever and one of said radial arms; a reciprocating member forming part of the steering mechanism; and cam fingers secured thereto each adapted in its movement to engage the other arm of one of said levers and move it about its pivot.

3. A device for operating the lamps of a motor car, consisting of vertical lamp supports; a bearing for each of said supports in which said supports are movable vertically, said bearings being provided with notches in their upper faces each having an inclined wall; a member secured to each of said supports having a lug adapted to engage with one of said notches; springs for retaining said lugs normally in the bottom of said notches; a radial arm secured to each support; a two-armed pivoted lever for each lamp support; a link between one arm of each lever and one of said radial arms; a reciprocating member forming part of the steering mechanism; cam fingers secured thereto each adapted in its movement to engage the other arm of one of said levers and move it about its pivot; and means whereby said cam finger may be moved into an inoperative position.

4. A device for operating the lamps of a motor car, consisting of vertical lamp supports; a bearing for each of said supports in which said supports are movable vertically, said bearings being provided with notches in their upper faces each having an inclined wall; a member secured to each of said supports having a lug adapted to engage with one of said notches; a spring for retaining said lug normally in the bottom of said notch; a radial arm secured to each support; a two-armed pivoted lever for each lamp support; a link between one arm of each lever and one of said radial arms; a reciprocating member forming part of the steering mechanism; flat-sided members secured to said reciprocating member; cam fingers each provided with a socket adapted to receive one of said flat-sided members; collars on said reciprocating member; and a spring between each collar and each finger adapted to retain said finger in engagement with one of said flat-sided members.

Signed by me at 4 Post Office Sq., Boston, Mass., this 5th day of March, 1910.

WARREN A. GREENLAW.

Witnesses:
 WALTER E. LOMBARD,
 EDNA C. CLEVELAND.